(12) United States Patent
Rick

(10) Patent No.: US 9,254,813 B2
(45) Date of Patent: Feb. 9, 2016

(54) MOTOR VEHICLE BODY WITH EXPANDABLE ELEMENT

(71) Applicant: GM GLOBAL TECHNOLOGY OPERATIONS LLC, Detroit, MI (US)

(72) Inventor: Ulrich Rick, Braunweiler (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 13/670,840

(22) Filed: Nov. 7, 2012

(65) Prior Publication Data

US 2013/0119644 A1   May 16, 2013

(30) Foreign Application Priority Data

Nov. 10, 2011   (DE) .................. 10 2011 118 122

(51) Int. Cl.
 *B60R 21/36* (2011.01)

(52) U.S. Cl.
 CPC ..................................... *B60R 21/36* (2013.01)

(58) Field of Classification Search
 CPC ........................................................ B60R 21/36
 USPC ...................................... 280/728.2; 180/274
 See application file for complete search history.

(56) References Cited

U.S. PATENT DOCUMENTS

| 7,172,048 B2 * | 2/2007 | Hamada et al. ............... 180/274 |
| 8,167,075 B2 * | 5/2012 | Inoue et al. ................... 180/274 |
| 2010/0252351 A1 | 10/2010 | Okamoto et al. |

FOREIGN PATENT DOCUMENTS

| DE | 10353447 A1 | 6/2005 | |
| DE | 60207393 T2 | 7/2006 | |
| EP | 2088039 A1 * | 8/2009 | ............. B60R 21/34 |
| EP | 2147834 A1 | 1/2010 | |
| JP | 2006076448 A | 3/2006 | |
| JP | 2008189184 A | 8/2008 | |
| JP | 2012076492 A | 4/2012 | |
| WO | 2011162123 A1 | 12/2011 | |
| WO | WO 2011162122 A1 * | 12/2011 | ............. B60R 21/36 |
| WO | WO 2011162123 A1 * | 12/2011 | ............ B60R 21/213 |

OTHER PUBLICATIONS

Great Britain Patent Office, Great Britain Search Report for Great Britain Application No. 1219105.2, dated Feb. 14, 2013.

* cited by examiner

*Primary Examiner* — Ruth Ilan
*Assistant Examiner* — Joselynn Y Sliteris
(74) *Attorney, Agent, or Firm* — Ingrassia Fisher & Lorenz PC

(57) ABSTRACT

A body for a motor vehicle that encompasses a windshield and has an A-column flanking the windshield is provided. The body includes at least one expandable element mounted on the A-column along the edge of the windshield. The body also includes and a cover that covers an installation space of the at least one expandable element and tightly adjoins the windshield.

18 Claims, 3 Drawing Sheets

MOTOR VEHICLE BODY WITH EXPANDABLE ELEMENT

CROSS-REFERENCE TO RELATED APPLICATION

This application claims priority to German Patent Application No. 10 2011 118 122.2, filed Nov. 10, 2011, which is incorporated herein by reference in its entirety.

TECHNICAL FIELD

The present disclosure relates to a body with an element that can expand during an accident, so as to dampen the potential impact of a pedestrian on the body.

BACKGROUND

Known from DE 103 53 447 A1 is to design the A-column of a motor vehicle body as a shell-like longitudinal profile sealed by a movable cover, whose inner cavity incorporates an expandable element. When the latter expands during an accident, the cover is pressed away from the A-column, so as to potentially cushion and decelerate the head of a pedestrian before it reaches the A-column.

The A-column of a motor vehicle should itself be as slim as possible so as not to unnecessarily limit the visual field of the driver. This requirement is difficult to satisfy with the conventional structure mentioned above, since space must be provided inside the groove not only for the expandable element, but also for connecting elements that prevent the cover from being flung away by the expansion of the expandable element, and the cover projects over the edges of the groove on both sides.

Accordingly, it may be desirable to provide a body of a motor vehicle in which a pedestrian is effectively protected during an impact with the A-column on the one hand, while not unnecessarily enlarging the cross section of the A-column on the other. In addition, other objects, desirable features and characteristics will become apparent from the subsequent summary and detailed description, and the appended claims, taken in conjunction with the accompanying drawings and this background.

SUMMARY

In one of various exemplary embodiments, a motor vehicle body is provided with an A-column flanking a windshield, at least one expandable element mounted on the A-column along the edge of the windshield and a cover that covers an installation space of the expanding element by having the cover tightly adjoin the windshield. As a consequence, by having the cover simultaneously perform the functions of a sealing profile conventionally mounted along the edge of the windshield, the overall cross section of the A-column can be kept small, minimizing any visual limitation of the driver. In addition, this simplifies assembly and decreases costs by reducing the number of individual parts integrated into the body.

The cover is generally anchored to the A-column on an edge facing away from the windshield. Given an expansion of the expandable elements, the edge of the cover facing the windshield can thus be pressed away, and the expandable element can get out into the open through the resultant gap.

To let the expandable element through, a principal part of the cover can generally be swiveled around an axis adjacent to the averted edge by expanding the expandable element.

To enable the swiveling motion, generally at least regions of the cover can be reversibly deformed. Thanks to the reversibility, the cover can again be placed in its original position at the edge of the windshield after the expandable element has expanded, and need not be replaced at a high cost.

If the deformability is elastic too, the cover can at least largely, if not completely, return to its normal position of its own accord after expansion, which also helps to simplify repairs.

The edge of the cover facing the windshield on the one hand generally exhibits a sealing lip that abuts against the outside of the windshield, and on the other a retaining lip that abuts against a narrow side or interior side of the windshield and fixes the cover in place in its normal position.

On its part, the expandable element generally exhibits a membrane that is reversibly extensible, so that it returns to its normal configuration after expansion is complete and can be reused. The membrane is also generally elastic, so that it can return to its normal configuration without any outside action, which further diminishes repair outlays after an expansion.

In one exemplary embodiment, the membrane extends along the A-column like a tube. In another exemplary embodiment, the membrane has a single layer, and has edges tightly secured on the A-column, acting in conjunction with the latter to form a chamber that can be charged with a propellant fluid to expand the expandable element, in one example with a propellant gas from a gas generator.

The expandable element and a gas generator for supplying the latter are generally secured on two sides of a support plate of the A-column.

This support plate can be a constituent, in one example a one-piece constituent, in the outer wall of the A-column; as an alternative, however, the support plate can be joined with the at least one expandable element and the at least one generator to yield a removable assembly.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
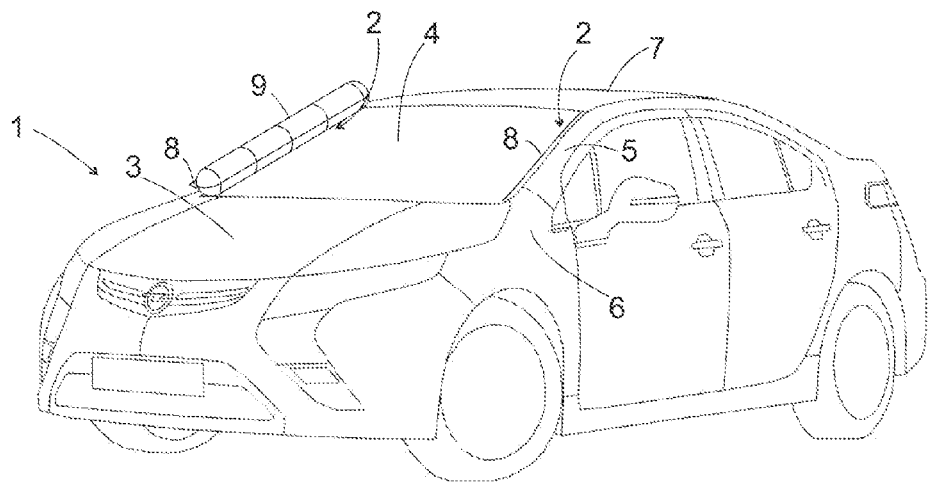
FIG. 1 is a view of an exemplary motor vehicle according to various teachings of the present disclosure.

FIG. 1 shows a perspective view of a motor vehicle 1 with a windshield 4 bordered laterally by A-columns 2 and from below by a hood. The A-column 2 on the right hand side as viewed by an observer is depicted in the normal state; a freestanding section 5 of an outer wall of the A-column 2 passes over downwardly into a front fender 6 and upwardly into a roof area 7. An elastic cover 8 extends between the freestanding section 5 and windshield 4. Concealed inside the A-column 2 under the cover 8 is an expandable element, e.g., in the form of a rubber hose, which is hooked up to gas generators, in one example pyrotechnic generators, so as to be expanded during an accident.

The expandable element here marked 9 is shown in the expanded state on the A-column 2 on the left hand side as viewed by an observer. In the course of its expansion, it has pressed the cover 8 to the side, and now extends substantially cylindrically over the entire length of the A-column 2, covering the latter.

The illustration on FIG. 1 is not entirely realistic, since a case in which only one of the two expandable elements 9 has expanded is not encountered in practice. Rather, both expandable elements 9 in conjunction with passenger protection systems, which are known in the art and thus not explained in any greater detail here, and actuators for lifting up the hood 3 are coupled to a shared control unit, which simultaneously activates all of these devices upon the detection of an accident.

Figure 2:
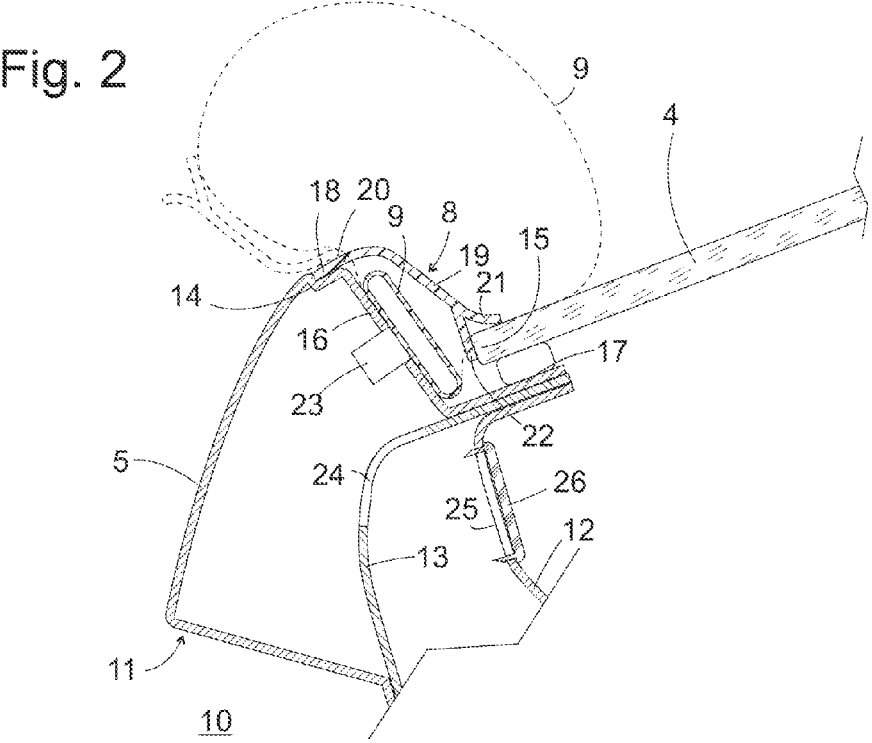
FIG. 2 is a schematic cross section through an A-column of the vehicle from FIG. 1 according to an exemplary embodiment of the present disclosure.

FIG. 2 presents a schematic section through one of the A-columns 2 according to an exemplary embodiment of the present disclosure. The cutting plane substantially extends perpendicular to the longitudinal direction of the A-column 2. The A-column 2 encompasses several metal sheets welded together along their longitudinal edges, including the in part freestanding outer wall 11 between the windshield 4 and a door portal 10, an inner wall 12 facing the passenger cabin, along with a support wall 13 that here extends between the walls 11, 12.

The freestanding section 5 of the outer wall 11 is here bordered from the front or toward the windshield 4 by a flat step 14. The latter is adjoined by a support plate 16, which extends toward the passenger cabin and faces a narrow side 15 of the windshield 4, and is in turn adjoined by an edge web 17 oriented substantially parallel to the windshield 4. This edge web 17 is welded with corresponding edge webs of the walls 12, 13, and carries the lateral edge of the windshield 4.

The expandable element 9 is secured to the outside of the support plate 16 facing the windshield 4. FIG. 2 depicts this element 9 in cross section in an unexpanded state, and as a dashed outline in an expanded state. Its walls are here tubular, and comprise an elastically extensible material, such as natural rubber or synthetic rubber. In the unexpanded state, it is concealed by the cover 8 so as not to be visible from outside.

The cover 8 encompasses an outer edge section 18 anchored to the step 14, e.g., through adhesive bonding, an arced primary section 19 that bridges the intermediate space between the step 14 and narrow side 15 of the windshield 4, a highly flexible articulated section 20 between the sections 18, 19, as well as an inner edge section facing the windshield 4 with two lips arranged like a V, a sealing lip 21 that abuts against the outside of the windshield 4, and a retaining lip 22 that engages the narrow side 15. The sealing lip 21 is kept elastically tensioned through contact between the retaining lip 22 and narrow side 15, so that it abuts the windshield so as to form a rainproof seal.

If a gas generator 23 that is mounted on the inside of the support plate 16 and communicates with the expandable element 9 is triggered during an accident, the element 9 starts to expand, and in so doing presses from inside against the primary section 19. This causes the retaining lip 22 to glide off the narrow side 15 of the windshield 4, and the primary section 19 and lips 21, 22 swivel around the hinged section 20 into a position depicted on FIG. 2 as a dashed outline, in which they clear the way for the expandable element 9 to get out into the open. As a result, the expandable element 9 ultimately forms an expanded pad in front of the A-column 2, which can cushion and decelerate an impacting body several centimeters in front of the A-column 2.

Once the expandable element 9 has carried out its function, and the gas has once again been drained from its interior, its elasticity causes it to return to the normal configuration shown in cross section on FIG. 2. The cover 8 also flips back in the direction of its idle configuration once again, but does not reach it automatically, since the retaining lip 22 hits the outside of the windshield 4 beforehand. By shifting the sealing lip 21 against the elastic resistance of the primary section 19 in the direction of the support plate 16, the retaining lip 22 can be forced back behind the narrow side 15, and latch itself in there, so that the original configuration of the cover 8 can also be easily and quickly restored once again. Only the gas generators 23 expended during activation have to be changed out in order to restore the operational capability of the system again. For this purpose, openings 24, 25 can be carved into the partition 13 and interior wall 12, through which access can be gained to the gas generators 23 in the A-columns from the passenger cabin after removing a lid 26 that normally seals the opening 25.

Figure 3:
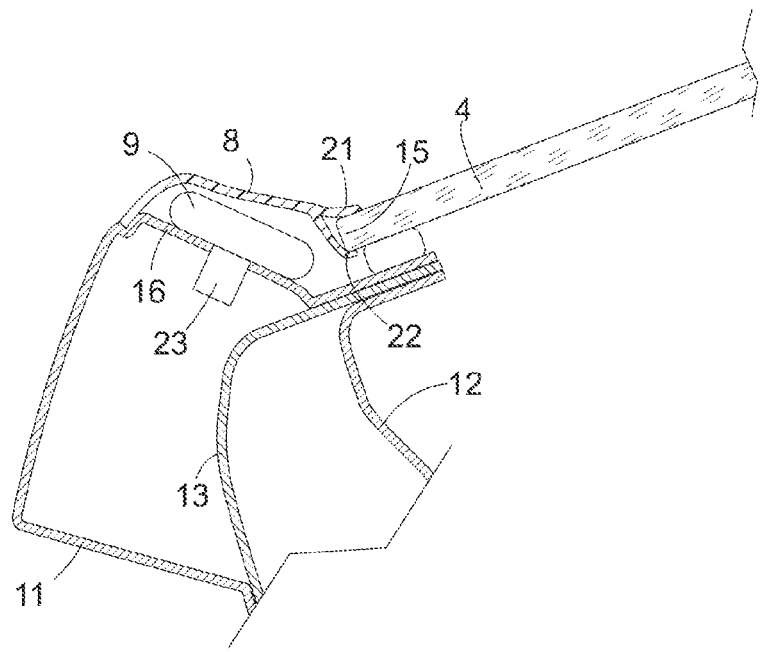
FIG. 3 is a cross section analogous to FIG. 2 according to another exemplary embodiment.

As shown on FIG. 3, the support plate 16 can be oriented toward the front instead of face the edge 15 of the windshield 4, so as to facilitate an expansion of the expandable element 9 against the traveling direction. The shape of the cover 8 is adjusted to the altered orientation of the support plate 16 by having its retaining lip 22 be slightly curved, and engage not just the narrow side 15, but also the rear side of the windshield 4.

Figure 4:
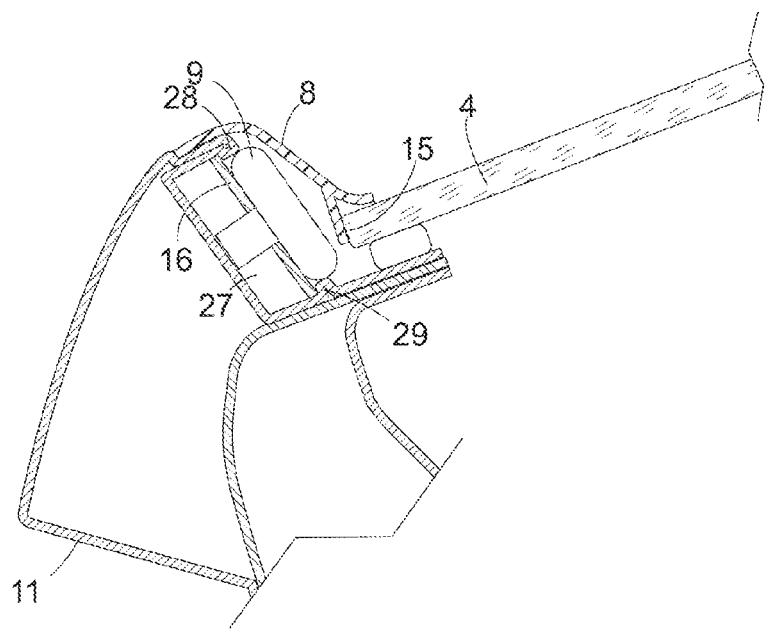
FIG. 4 is a cross section analogous to FIG. 3 according to another exemplary embodiment.

In the exemplary embodiment of FIG. 4, the orientation of the support plate 16 again corresponds to the one shown in FIG. 2, but as opposed to the exemplary embodiment of FIG. 2, the support plate 16 here is not a one-piece constituent of the outer wall 11; rather, the outer wall 11 is molded into a back-cut groove 27, on whose inwardly directed projections 28, 29 the elastically flexible support plate 16 is anchored. Following an activation, the support plate 16 along with the expandable element 9 and expended gas generator 23 can be removed from the groove 27, and reinserted after replacing the gas generator 23.

Figure 5:
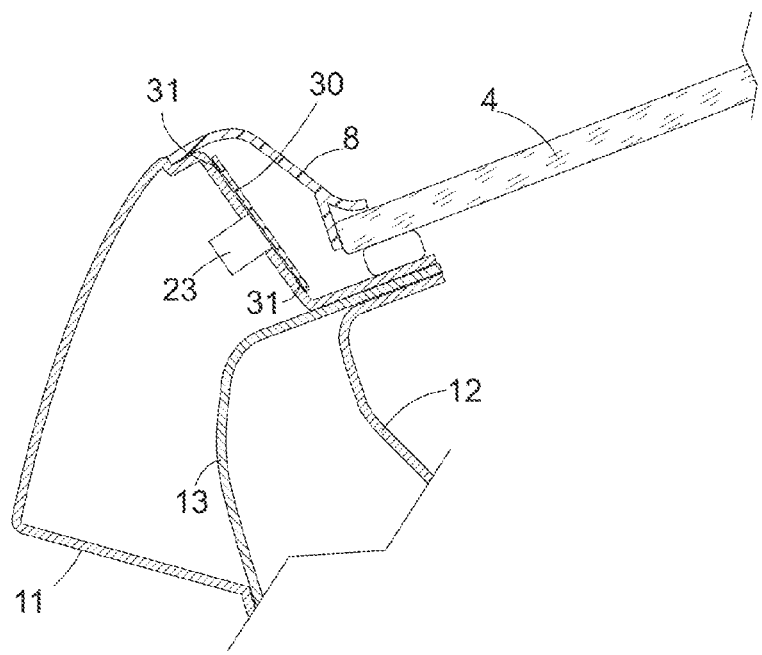
FIG. 5 is a cross section analogous to FIG. 2 according to another exemplary embodiment.

FIG. 5 shows another modification of the exemplary embodiment of FIG. 2, in which the tubular, expandable element 9 is replaced by a simple, one-layer membrane 30, which is tightly joined along its edges with the support plate 16. For example, such a tight connection 31 can be an adhesive bond or, if at least the surface of the support plate 16 comprises a material suitable for this purpose, a vulcanized bond. In order to replace the gas generator 23, openings can be cut out of the walls 12, 13, as described with reference to FIG. 2.

Figure 6:
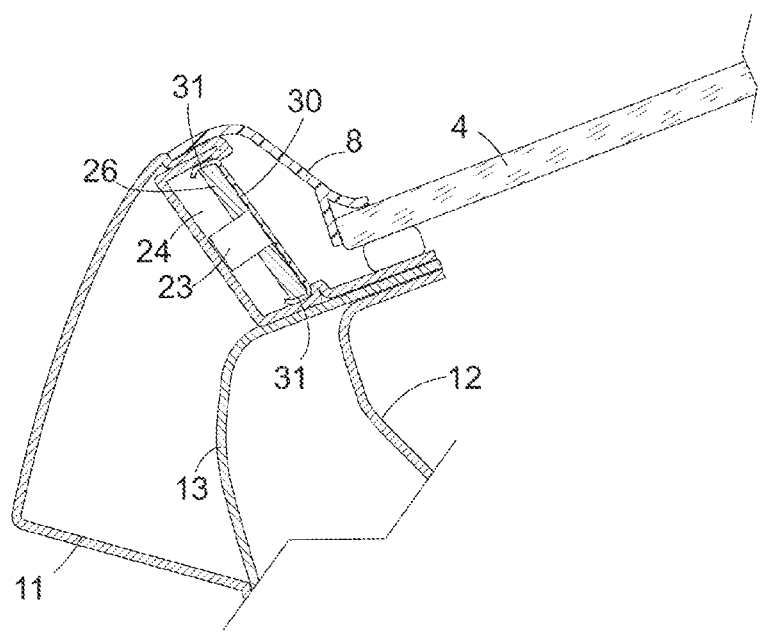
FIG. 6 is a cross section analogous to FIG. 2 according to another exemplary embodiment.

The exemplary embodiment of FIG. 6 combines features from the exemplary embodiments of FIGS. 4 and 5. As in the case of FIG. 4, the outer wall is molded into a back-cut groove 24, which positively incorporates the elastic support plate 16. An adhesive or vulcanized bond 31 of the membrane 27 on the support plate 16 can here be confined to the narrow sides of the support plate 16, on which the membrane 27 is additionally secured by clamping between the support plate 16 and walls of the groove 24.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A body for a motor vehicle with an A-column flanking a windshield, comprising:
    at least one expandable element configured to be mounted on the A-column along an edge of the windshield; and
    a cover having:
        a lip including a first lip portion configured to engage a narrow side of the windshield and a second lip portion configured to abut an outer surface of the windshield to form a weather-resistant seal for covering an installation space of the expandable element and tightly adjoining the windshield; and
        a hinged section, opposite the lip, anchored to an outer edge of the A-column;
        wherein the cover is fixedly secured to the A-column and swivels about the hinged section from a closed position to an open position by expanding the at least one expandable element.

2. The body according to claim 1, wherein at least the hinged section of the cover is reversibly deformed when the cover swivels from the closed position to the open position.

3. The body according to claim 1, wherein an edge of the cover facing the windshield exhibits the second lip portion that abuts against the outside of the windshield, and the first lip portion that abuts against an interior side of the windshield.

4. The body according to claim 1, wherein the at least one expandable element encompasses a reversibly extensible membrane.

5. The body according to claim 4, wherein the membrane is tubular.

6. The body according to claim 4, wherein the membrane is a single layer, and has edges tightly secured on the A-column.

7. The body according to claim 1, wherein the at least one expandable element and at least one gas generator for expanding the at least one expandable element are secured on two sides of a support plate of the A-column.

8. The body according to claim 7, wherein the support plate is a constituent of an outer wall of the A-column.

9. The body according to claim 7, wherein the support plate is joined with the at least one expandable element and the at least one generator to yield a removable assembly.

10. The body according to claim 1 wherein the cover is configured to swivel from the closed position through an angle of at least 90° to the open position.

11. A motor vehicle, comprising:
    a windshield;
    a body having an A-column that flanks the windshield when the windshield is coupled to the body;
    at least one expandable element mounted on the A-column along an edge of the windshield; and
    a cover that covers an installation space of the expandable element and tightly adjoins the windshield, the cover having:
        a lip including a first lip portion configured to engage a narrow side of the windshield and a second lip portion configured to abut an outer surface of the windshield to form a weather-resistant seal; and
        a hinged section, opposite the lip, fixedly secured to an outer edge of the A-column;
        wherein the cover is anchored to the A-column and swivels about the hinged section from a closed position to an open position by expanding the at least one expandable element.

12. The motor vehicle according to claim 11, wherein at least the hinged section of the cover is reversibly deformed when the cover swivels from the closed position to the open position.

13. The motor vehicle according to claim 11, wherein an edge of the cover facing the windshield exhibits the second lip portion that abuts against the outside of the windshield, and the first lip portion that abuts against an interior side of the windshield.

14. The motor vehicle according to claim 11, wherein the at least one expandable element encompasses a reversibly extensible membrane.

15. The motor vehicle according to claim 14, wherein the membrane is tubular.

16. The motor vehicle according to claim 14, wherein the membrane is a single layer, and has edges tightly secured on the A-column.

17. The motor vehicle according to claim 11, wherein the at least one expandable element and at least one gas generator for expanding the at least one expandable element are secured on two sides of a support plate of the A-column.

18. The motor vehicle according to claim 11 wherein the cover is configured to swivel from the closed position through an angle of at least 90° to the open position.

\* \* \* \* \*